United States Patent [19]

Mangano et al.

[11] Patent Number: 6,035,889
[45] Date of Patent: Mar. 14, 2000

[54] LOW COST ABSOLUTE PRESSURE CONTROLLER FOR PLENUM PRESSURE REGULATION

[75] Inventors: Roy A. Mangano; Werner J. Kroebig, both of Tucson, Ariz.

[73] Assignee: Raytheon Company, Lexington, Mass.

[21] Appl. No.: 08/975,781

[22] Filed: Nov. 21, 1997

[51] Int. Cl.[7] .................................................. F16K 15/00
[52] U.S. Cl. ........................................ 137/529; 137/906
[58] Field of Search ..................... 137/529, 906

[56] References Cited

U.S. PATENT DOCUMENTS

| | | | |
|---|---|---|---|
| Re. 32,553 | 12/1987 | Bennett et al. | 137/528 |
| 2,697,581 | 12/1954 | Ray | 251/335.2 |
| 2,702,686 | 2/1955 | Fortune | 251/335.2 |
| 2,727,532 | 12/1955 | Sousa et al. | 137/528 |
| 3,085,549 | 4/1963 | Kacsuta | 137/844 |
| 3,636,969 | 1/1972 | Jacobellis | 137/528 |
| 3,698,688 | 10/1972 | Kutz | 251/335.2 |
| 3,758,073 | 9/1973 | Schulte | 251/335.2 |
| 3,776,263 | 12/1973 | Hubenthal | 251/335.2 |
| 4,190,045 | 2/1980 | Bartels | 137/528 |
| 5,205,325 | 4/1993 | Piper | 137/844 |

FOREIGN PATENT DOCUMENTS

| | | | |
|---|---|---|---|
| 429215 | 10/1974 | U.S.S.R. | 137/529 |

*Primary Examiner*—Henry Bennett
*Assistant Examiner*—Joanne Y. Kim
*Attorney, Agent, or Firm*—David W. Collins; Andrew J. Rudd; Glenn H. Lenzen, Jr.

[57] ABSTRACT

A low cost diaphragm actuated absolute pressure regulator. The regulator comprises a housing having first and second sections that are secured together. The first section has a cavity and a diaphragm that seals the cavity and first section of the housing. An O-ring seal is disposed in a groove of the first section that seals against the diaphragm. The second section of the housing houses a movable and sealable vent plug that moves in response to movement of the diaphragm, and one or more vent openings for venting the interior of the second section to external pressure in response to motion of the diaphragm. The pressure regulator may be preferentially used in an upper atmospheric system that needs to maintain a specified pressure, but requires venting capabilities. Such systems include missiles that fly into the upper atmosphere. In addition, the pressure regulator may be used in cabins or compartments that require venting, but maintain a constant inner pressure for comfort or safety reasons, such as in passenger vehicles. The pressure regulator maintains the passenger space of the vehicle at a constant pressure, thus eliminating altitude related pressure variations.

4 Claims, 1 Drawing Sheet

LOW COST ABSOLUTE PRESSURE CONTROLLER FOR PLENUM PRESSURE REGULATION

BACKGROUND

The present invention relates generally to pressure regulators, and more particularly, to a diaphragm actuated absolute pressure regulator.

The assignee of the present invention manufactures missile systems that use a focal plane array infrared sensor that requires cooling to approximately 90° K. The focal plane array and infrared sensor is disposed within a compartment on the missile. The temperature of the focal plane array and infrared sensor must be maintained within a few tenths of a degree Kelvin for precise target acquisition. Joule-Thompson coolers using argon or nitrogen gas are employed to cool the focal plane array infrared sensor. A constant supply of gas vents into the compartment housing the focal plane array infrared sensor from the Joule-Thompson cooler which must be vented.

During cooldown, large variations in the pressure within the compartment housing the focal plane array infrared sensor would result in temperature excursions due to the thermodynamic properties of the gas supplied to the Joule-Thompson cooler. A pressure regulator is required on high altitude missiles, and specifically those that travel to altitudes in excess of 60,000 feet, to prevent over or under venting of the compartment housing the focal plane array infrared sensor.

The currently used pressure regulator design incorporates bellows to regulate the flow of gas. Vacuum is drawn on the bellows, and the bellows are spring loaded to apply a force equivalent to that which would be applied by atmospheric pressure at sea level (14.696 psia). Welded bellows are costly, require a great deal of space, and are unreliable because of many welds that are required to manufacture the bellows. It has been found that after several uses, the bellows have been found to leak, thus destroying the internal vacuum within the bellows, compromising the pressure in the compartment housing the focal plane array infrared sensor and the Joule-Thompson cooler.

Accordingly, it is an objective of the present invention to provide for a diaphragm actuated absolute pressure regulator. It is a further objective of the present invention to provide for a diaphragm actuated absolute pressure regulator that may be used to vent a compartment housing a focal plane array infrared sensor employed on a high altitude missile system.

SUMMARY OF THE INVENTION

To meet the above and other objectives, the present invention provides for a low cost diaphragm actuated absolute pressure regulator. The diaphragm actuated absolute pressure regulator comprises a housing having first and second sections. The first and second sections may be secured together using a plurality of machine screws disposed though openings in the first section that insert into threaded holes in the second section, for example.

The first section has a cavity, and a diaphragm that seals the cavity at a groove in the first section of the housing. To achieve this, an O-ring seal is disposed in the groove of the first section that seals against the diaphragm. The second section of the housing comprises a movable and sealable vent plug that moves in response to movement of the diaphragm, and a vent opening for venting a compartment (such as an interior of a missile, for example, to external pressure in response to motion of the diaphragm.

The design of the diaphragm actuated absolute pressure regulator varies from current design technologies in that it utilizes a diaphragm for pressure regulation instead of bellows. In the present invention, a single diaphragm replaces the bellows of the predecessor regulator. The present diaphragm actuated absolute pressure regulator only requires one weld line, thus reducing construction costs and increasing the robustness. The present diaphragm actuated absolute regulator is also more compact than its predecessor, thus reducing weight, and is simpler to construct, thus reducing cost.

The diaphragm actuated absolute pressure regulator may be used to vent a compartment housing a focal plane array infrared sensor employed on a high altitude missile system. However, the diaphragm actuated absolute pressure regulator may be used in any upper atmospheric system that needs to maintain a specified pressure, but requires venting capabilities. Typical systems include missile systems, such as certain ones manufactured by the assignee of the present invention, that fly into the upper atmosphere.

The diaphragm actuated absolute pressure regulator may also be used commercially in cabins or compartments that require venting, but maintain a constant inner pressure for comfort or safety reasons. For example ear popping occurs when driving a vehicle through mountains. By using the present pressure regulator, the passenger space of the vehicle may be maintained at a constant pressure (when the vehicle is sealed, with its windows rolled up, and air conditioning in operation), thus eliminating altitude related pressure variations.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
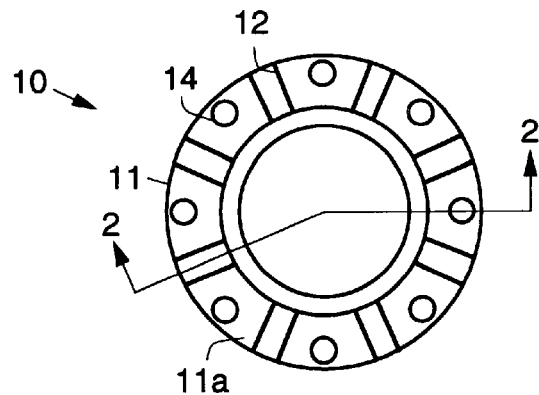
FIG. 1 illustrates a top view of a diaphragm actuated absolute pressure regulator in accordance with the principles of the present invention.
Figure 2:
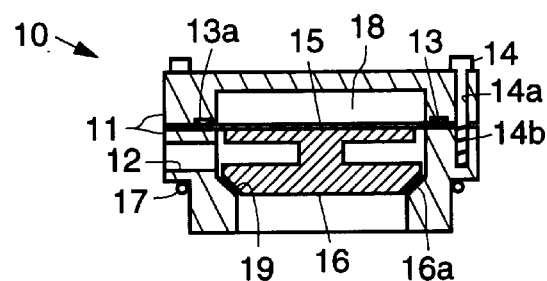
FIG. 2 illustrates a cutaway side view of the diaphragm actuated absolute pressure regulator of FIG. 1 taken along the lines 2—2.
Figure 3:
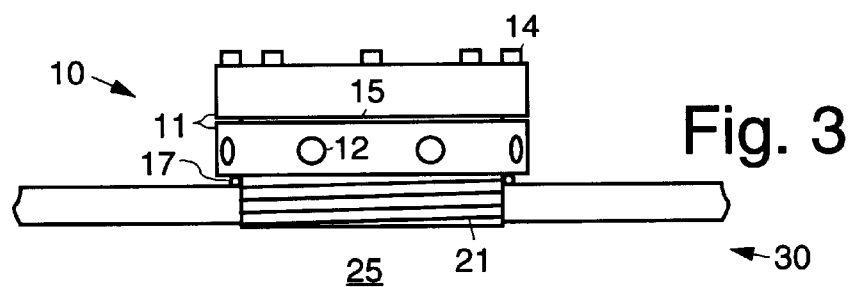
FIG. 3 illustrates a side view of the diaphragm actuated absolute pressure regulator of FIG. 1.

Referring to the drawing figures, FIG. 1 illustrates a diaphragm actuated absolute pressure regulator 10 in accordance with the principles of the present invention. FIG. 2 illustrates a cutaway side view of the pressure regulator 10 of FIG. 1 taken along the lines 2—2. FIG. 3 illustrates a side view of the pressure regulator 10 of FIG. 1.

The diaphragm actuated absolute pressure regulator 10 may be used to vent a compartment 25, such as an interior compartment 25 of a missile 30 that houses a focal plane array infrared sensor (not shown), for example. In such a missile application, the sensor is cooled using a Joule-Thompson cooler (not shown), for example, to temperature that must be maintained with little or no temperature variation if accurate target acquisition it to be achieved. During the cooldown cycle, the pressure in the compartment 25 that houses the focal plane array infrared sensor must remain substantially constant, and the constant pressure (reference) is usually atmospheric pressure at sea level.

The diaphragm actuated absolute pressure regulator 10 comprises a housing 11 having first and second sections 11a, 11b. The first section 11a of the housing 11 has a cavity 18 which is sealed by means of a diaphragm 15. Atmospheric pressure (14.696 psia) is sealed within the cavity 18. An O-ring seal 13 is disposed in a groove 13a of the first section 11a that seals against the diaphragm 15 to prevent leakage into, or out of, the cavity 18.

The second section 11b of the housing 11 has a stepped configuration with a chamfered seating surface 19. A chamfered movable and sealable vent plug 16 is disposed within the second section 11b of the housing 11 that has a chamfered surface 16a that abuts the chamfered seating surface 19 in the second section 11b of the housing 11. The movable vent plug 16 moves in response to motion of the diaphragm 15. One or more vent openings 12 are disposed through the second section 11b of the housing 11 to vent the interior thereof so that it is exposed to external pressure.

The diaphragm actuated absolute pressure regulator 10 may be disposed in an opening in the compartment 25 that houses the focal plane array infrared sensor, for example. A bulkhead seal 17 is provided between the diaphragm actuated absolute pressure regulator 10 and the compartment 25. A portion of the exterior of the pressure regulator 10 is threaded 21 to permit it to be secured in the opening in the compartment 25. The diaphragm actuated absolute pressure regulator 10 thus provides a means for venting the compartment 25 and to thus keep the pressure therein substantially constant.

By way of example, in a missile application, for example, for pressure control during venting, the diaphragm actuated absolute pressure regulator 10 is used on a high altitude missile 30 to prevent over-venting of the compartment 25 that houses the focal plane array infrared sensor. Likewise, the compartment 25 must vent to prevent over pressurization, which would result in temperature excursions (or compartment structural failure due to bursting of the compartment 25). An atmospheric pressure reference is provided by the cavity 18 of the housing 11, and the diaphragm 15 is used to apply a load to the vent plug 16 that is equivalent to the required compartment pressure.

Figure 4:
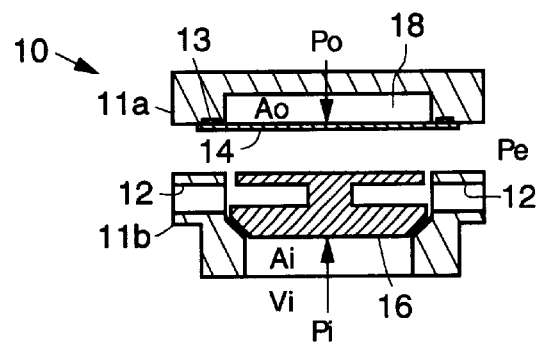
FIG. 4 depicts diaphragm force balancing in the diaphragm actuated absolute pressure regulator.

Referring now to FIG. 4, a force balance on the diaphragm (neglecting the mass of the vent plug 16) is given by the equation:

$$P_o * A_o = P_i * A_i,$$

where, $P_o$ and $P_i$ are the captured volume pressure of the cavity 18 and the internal pressure of the compartment 25, respectively. $A_o$ and $A_i$ are the areas each pressure acts upon. If the vent plug 16 is designed such that:

$A_o \approx A_i$, then, $P_o \approx P_i$, and the internal compartment volume, $V_i$, effectively remains at atmospheric (sea level) pressure. The external pressure, $P_e$, applies an equal force to the diaphragm 15, cavity 18 and vent plug 16, and thus has no effect on the system. Therefore, the pressure inside the compartment 25 is maintained at the pressure the cavity 18 (14.696 psia). As the missile 30 increases altitude, the external pressure decreases. The pressure regulator 10 only allows venting if the pressure inside the compartment 25 is greater than 14.696 psia. Otherwise, the regulator 10 remains closed.

It should also be noted that in this design, unlike the bellows design, the regulator 10 closes to prevent backflow if an external pressure rise occurs that is greater than the captured volume pressure of 14.696 psia within the cavity 18. Such an incident may occur when the missile 30 is launched from a transport tube (using a kick motor for ejection), or in flight when the missile 30 passes through the first transonic (the speed of sound).

Thus, a diaphragm actuated absolute pressure regulator has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An absolute pressure regulator comprising:
    a housing having first and second sections;
    wherein the first section comprises:
        a cavity sealed by a diaphragm, the cavity sealing atmospheric pressure therewithin, the atmospheric pressure being that at sea level; and
        an O-ring seal disposed in a groove in the first section that seals against the diaphragm;
    and wherein the second section of the housing comprises:
        a movable and sealable vent plug that moves in response to movement of the diaphragm; and
        a vent opening for venting the interior of the second section of the housing to external pressure in response to motion of the diaphragm.

2. The pressure regulator of claim 1 wherein the interior of the second section of the housing has a chamfered seating surface, and wherein the vent plug is chamfered to match the chamfered seating surface.

3. The pressure regulator of claim 1 that is connected to a compartment, for venting the compartment as a function of pressure.

4. The pressure regulator of claim 3 further comprising:
    a bulkhead seal disposed between the diaphragm pressure regulator and the compartment;
    and wherein the second section of the housing is threaded so that it may be coupled to the compartment that is to be pressure regulated.

* * * * *